(12) United States Patent  (10) Patent No.: US 7,735,738 B2
Barkan et al.  (45) Date of Patent: Jun. 15, 2010

(54) THERMAL MANAGEMENT IN IMAGING READER

(75) Inventors: Edward Barkan, Miller Place, NY (US); Mark Drzymala, Commack, NY (US); Bradley Carlson, Huntington, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 264 days.

(21) Appl. No.: 11/823,815

(22) Filed: Jun. 28, 2007

(65) Prior Publication Data

US 2009/0001174 A1  Jan. 1, 2009

(51) Int. Cl.
*G06K 7/10* (2006.01)
*H02P 1/00* (2006.01)

(52) U.S. Cl. ............................... 235/462.42; 235/462.3

(58) Field of Classification Search ................. 235/454, 235/462.15, 462.27, 462.42
See application file for complete search history.

(56) References Cited

U.S. PATENT DOCUMENTS

| 5,850,078 | A | * | 12/1998 | Giordano et al. | ....... | 235/462.27 |
| 6,617,795 | B2 | * | 9/2003 | Bruning | ...................... | 315/151 |
| 7,487,916 | B2 | * | 2/2009 | Cai et al. | ............... | 235/462.15 |
| 2003/0062413 | A1 | | 4/2003 | Gardiner et al. | | |
| 2006/0016891 | A1 | | 1/2006 | Giebel et al. | | |
| 2007/0108284 | A1 | * | 5/2007 | Pankow et al. | ............... | 235/454 |

FOREIGN PATENT DOCUMENTS

WO  WO 2005/008790 A2  1/2005
WO  WO2009/006392  1/2009

* cited by examiner

*Primary Examiner*—Daniel A Hess

(57) ABSTRACT

A reader for electro-optically reading indicia, includes a solid-state imager including an array of image sensors for capturing return light from the indicia during reading, and a light source for generating and directing high intensity illumination light to the indicia with concomitant generation of excess heat. Thermal management procedures for dissipating the excess heat are performed to improve reader performance.

39 Claims, 5 Drawing Sheets

THERMAL MANAGEMENT IN IMAGING READER

DESCRIPTION OF THE RELATED ART

Flat bed laser readers, also known as horizontal slot scanners, have been used to electro-optically read one-dimensional bar code symbols, particularly of the Universal Product Code (UPC) type, at a point-of-transaction workstation in supermarkets, warehouse clubs, department stores, and other kinds of retailers for many years. As exemplified by U.S. Pat. No. 5,059,779; No. 5,124,539 and No. 5,200,599, a single, generally horizontal window is set flush with, and built into, a generally horizontal countertop of the workstation. Products to be purchased bear an identifying symbol and are typically slid or swiped across the generally horizontal window through which a multitude of scan lines in a scan pattern is projected in a generally upward direction. Each scan line is generated by sweeping a laser beam from a laser. When at least one of the scan lines sweeps over a symbol associated with a product, the symbol is processed and read, and the product is identified.

Instead of, or in addition to, a horizontal slot scanner, it is known to provide a vertical slot scanner, which is typically a portable reader placed on the countertop such that its window is generally vertical and faces an operator at the workstation. The generally vertical window is oriented generally perpendicularly to the horizontal window, or is slightly rearwardly inclined. A scan pattern generator within the vertical slot scanner also sweeps a laser beam and projects a multitude of scan lines in a scan pattern in a generally outward direction through the generally vertical window toward the operator. The operator slides or swipes the products past either window from right to left, or from left to right, in a "swipe" mode. Alternatively, the operator merely presents the symbol on the product to the center of either window in a "presentation" mode. The choice depends on operator preference or on the layout of the workstation.

These point-of-transaction workstations have been long used for processing transactions involving products associated with one-dimensional symbols each having a row of bars and spaces spaced apart along one direction, and for processing two-dimensional symbols, such as Code 39, as well. Code 39 introduced the concept of vertically stacking a plurality of rows of bar and space patterns in a single symbol. The structure of Code 39 is described in U.S. Pat. No. 4,794,239. Another two-dimensional code structure for increasing the amount of data that can be represented or stored on a given amount of surface area is known as PDF417 and is described in U.S. Pat. No. 5,304,786.

Both one- and two-dimensional symbols can also be read by employing solid-state imagers to capture an image of each symbol, instead of moving a laser beam across each symbol in a scan pattern. For example, the imager may comprise a one- or two-dimensional array of cells or photosensors, which correspond to image elements or pixels in a field of view of the imager. Such an array may be comprised of a one- or two-dimensional charge coupled device (CCD) or a complementary metal oxide semiconductor (CMOS) device, analogous to those devices used in a digital camera to capture images. The imager further includes electronic circuitry for producing electrical signals indicative of the light captured by the array, and a microprocessor for processing the electrical signals to produce each captured image.

It is therefore known to use a solid-state imager for capturing a monochrome image of a symbol as, for example, disclosed in U.S. Pat. No. 5,703,349. It is also known to use a solid-state imager with multiple buried channels for capturing a full color image of a target as, for example, disclosed in U.S. Pat. No. 4,613,895. It is common to provide a two-dimensional CCD with a 640×480 resolution commonly found in VGA monitors, although other resolution sizes are possible.

It is also known to energize an illuminator associated with the imager-based reader to illuminate the symbol during its reading with illumination light emitted from an illumination light source and directed to the symbol for reflection therefrom. The illumination light source is preferably at least one light emitting diode (LED), and may include a plurality of LEDs. The illumination light source and the imager are typically mounted on a chassis to constitute an imaging engine or module that is located within the reader.

The reading performance of imager-based or imaging readers is highly dependent on the level of the illumination light that is directed to the symbol. If higher levels of the illumination light are to be projected from the imaging module for better reading performance, it will be necessary to drive the illumination LEDs that are mounted on the module at relatively high electrical drive currents, thereby concomitantly causing significant heat generation.

Although the known imaging readers are generally satisfactory for their intended purpose, this heat generation can cause significant problems, especially when the module is operating in a hot environment, and/or when installed in a housing that does not allow for heat dissipation. Excessive heat can reduce the operating lifetimes of the LEDs and other reader components, and can also degrade the performance of the imager itself. Some modules use a laser or LED aiming pattern generator to project an aiming pattern or mark on the symbol, which can also generate undesirable, and be damaged by, excessive heat, as well as degrading other components within the reader.

SUMMARY OF THE INVENTION

One feature of the present invention resides, briefly stated, in an imaging reader for, and a method of, electro-optically reading indicia, especially one- and/or two-dimensional symbols. Each symbol includes elements of different light reflectivity, i.e., bars and spaces. The reader could be configured as a hands-free and/or a hand-held housing having a window. The housing may have a handle for hand-held operation and/or a base for supporting the housing on a support surface for hands-free operation.

In some applications, the window could be omitted, in which event, the reader has a windowless opening at which the indicia are located for reading. As used herein, the term "presentation area" is intended to cover both a window and a windowless opening. In the case of the hands-free reader, the symbol is swiped past, or presented to, the presentation area and, in the case of the hand-held reader, the reader itself is moved and the presentation area is aimed at the symbol. In the preferred embodiments, the reader is installed in a retail establishment, such as a supermarket, especially in a cramped environment.

A one- or two-dimensional, solid-state imager is mounted in the imaging reader, and includes an array of image sensors operative for capturing return light from a one- or two-dimensional symbol or target through the presentation area during the reading to produce a captured image. Preferably, the array is a CCD or a CMOS array.

When the imaging reader is operated in low light or dark ambient environments, a light source is provided, typically inside the reader, for generating and directing illumination light through the presentation area to the indicia to illuminate the symbol. The light source preferably comprises one or more illumination light emitting diodes (LEDs). To facilitate reading, many readers are equipped with another light source, typically an aiming LED or a laser, operative for directing illumination light in a visual aiming pattern to and on the indicia. A controller or programmed microprocessor is operatively connected to the imager and the light source for controlling their operation.

As discussed above, the reading performance of the imaging reader is highly dependent on the level of the illumination light that is directed to the symbol. The higher the level of the illumination light, the better is the reading performance. Hence, high-powered light source(s) are electrically driven at relatively high electrical drive currents, thereby projecting high intensity illumination light onto the symbol. This, however, concomitantly undesirably generates significant excess heat that can degrade and shorten the working lifetime of components of the reader, especially the imager, the light source(s) and the controller.

In accordance with one aspect of the invention, various thermal management procedures are employed to dissipate the excess heat to improve reader performance. For example, each illumination LED is surface-mounted on one of a pair of opposite surfaces of a printed circuit board. Thermally conductive, metallized lands or pads, preferably of copper, are plated on the opposite surfaces of the board. A hole extends through the opposite surfaces of the board and is internally plated and lined with a thermally conductive, metallized layer, preferably of copper, in thermal communication with the lands on the opposite surfaces of the board. The LED is in thermal communication, preferably by soldering, with one of the lands to conduct the excess heat away from the LED from one of the lands on one surface via the plated hole to the lands on the opposite surface. This thermal management procedure is especially recommended when the board is small in area such that the lands on one surface, i.e., the front surface, of the board are insufficient in area to radiate the excess heat to the environment. By also using the land on the opposite rear surface to dissipate the excess heat, the total area for radiating the excess heat to the environment is increased, and the heat-sinking capability is enhanced.

A chassis comprised of a thermally conductive material, e.g., zinc, is operative for supporting at least the imager and the high-powered light source(s) to constitute an imaging module or scan engine. The chassis is preferably in thermal communication with one of the lands to conduct the excess heat away from the LED to the chassis. The opposite rear surface of the board is in close proximity with the thermally conductive chassis of the scan engine. Provision is made to conduct the excess heat from the opposite rear surface of the board to the chassis by means of a heat conductive medium, such as thermal grease or thermally conductive, silicone pads. Alternatively, the lands on the opposite rear surface of the board can be positioned in direct contact with the chassis. As a result, the entire chassis now becomes part of the heat sink for the high-powered light source(s).

It is known in prior art imaging engines to constitute the chassis of a thermally insulating material, such as plastic. However, the plastic chassis added no heat sinking ability. It is also known in prior art imaging engines to constitute the chassis of a thermally conductive material, such as metal. However, a leaded, not surface-mounted, LED was used and, hence, no provision existed to transfer heat from the LED to the chassis.

The metal chassis can have ribs or fins to aid in radiation of the excess heat to the ambient environment, but sometimes the scan engine is embedded in a product in such a way as to make radiation of the excess heat unavailable. Worse yet, the scan engine may be mounted close to a heat source that may actually increase the temperature of the scan engine. In these cases, additional measures must be taken to assure that the LEDs, and other electronic components in the engine, do not overheat.

In accordance with another aspect of this invention, a thermistor, a thermocouple, or a like thermal sensor is located in a circumambient region of the light source, for monitoring the temperature of the chassis and sensing when the excess heat reaches a predetermined threshold, and for generating a control signal when the threshold has been reached. For example, the thermal sensor can be mounted on a circuit board close to, or in contact with, the chassis. Thermal grease or other thermally conductive material may be used to insure that the thermal sensor is thermally connected to the chassis, the circuit board that supports the LEDs, or other part of the scan engine that is deemed to be representative of the temperature sensitive components in the scan engine that must be protected from overheating. The controller is advantageously operative for causing the excess heat to be reduced upon generation of the control signal. Alternatively, or in addition, a host in communication with the reader is provided for causing the excess heat to be reduced upon generation of the control signal.

Various thermal management procedures include at least one of the controller and the host being operative for shutting off the light source upon generation of the control signal; or for energizing the light source for a time period during reading with the high intensity illumination light, and for shortening the time period upon generation of the control signal; or for driving the light source with a high amplitude drive current during reading with the high intensity illumination light, and for reducing the high amplitude drive current upon generation of the control signal; or for driving the light source comprised of a plurality of light emitting diodes (LEDs) during reading with the high intensity illumination light, and for reducing the number of LEDs upon generation of the control signal; or for causing the imager to capture the return light in a plurality of images per frame during reading with the high intensity illumination light, and for reducing the number of images captured per frame upon generation of the control signal; or for periodically energizing the light source to cause the high level illumination light to illuminate the indicia during a plurality of frames, and periodically deenergizing the light source to cause the high level illumination light not to illuminate the indicia during at least one of the frames upon generation of the control signal. All of these thermal management procedures have in common the feature of reducing the heat generated by the LEDs. The thermal management procedures may be initiated in succession or in combinations depending on how hot the scan engine gets. At a first temperature threshold, moderate thermal management procedures can be initiated. If temperature continues to rise, further more aggressive thermal management procedures can be initiated.

One possible thermal management procedure could be to inhibit activation of the LEDs and other components of the engine entirely until such time as the temperature returns to an acceptable threshold level. Another possibility is to reduce the time that the LEDs are permitted to be turned on for each exposure of the imager. Other possibilities are to reduce the current to the LEDs during an exposure, to reduce the number of LEDs that are actuated, or to reduce the frequency with which the LEDs can be activated. An example of reducing LED activation frequency would be to reduce the number of images that the imager can capture each second, thereby eliminating the need to activate the LEDs as frequently. For example, some area imagers are capable of capturing images at up to 60 frames per second. This high frame rate can help the reader feel more responsive to a user, but in the case of an impending overheating condition, the frame rate might be reduced to 50, 40, or 30 frames per second, etc., as necessary, to achieve an acceptable temperature. This would permit the LEDs to be turned off during the time when the additional frames would otherwise be occurring. Users might notice a small loss of responsiveness when the number of frames is reduced, but this is preferable to failure of the reader.

Many imaging engines also have LEDs or lasers that are used to project a visual aiming pattern, mark, or beam of light on the symbol so as to facilitate reading. These aiming components also generate heat and are sensitive to overheating conditions. Thermal management procedures could therefore include the ability to reduce an electrical drive current to energize an aiming light source, to reduce a frequency of activation of the aiming light source (for example, only activating the aiming pattern every other frame), or to entirely turn off any aiming light source when the temperature exceeds a predetermined threshold.

When an overheating condition is detected by the thermal sensor that requires initiation of heat reducing procedures such as those described above, the scan engine can transmit a message, i.e., the control signal, to the host or to the controller that indicates that the overheating situation is occurring, so that measures can be taken to reduce the excess heat, thereby insuring that the scan engine can operate at maximum performance. For example, if the host is in control of the frame rate, the activation control of the illumination LEDs, or the aiming light source, the host can implement thermal management procedures as outlined above. Alternatively, or in addition, the controller, that decodes the symbol and controls some of the other reader components, can implement some or all of the thermal management procedure, either independently or in combination with the host The message sent to the host may take the form of transmitting the control signal from the thermal sensor directly to the host so that the host can monitor the scan engine temperature. Alternatively, if the scan engine includes an on-board microprocessor, then the message can be transmitted by activating a dedicated line or by transmitting the message in digital form.

In accordance with another aspect of the invention, the method of electro-optically reading indicia, comprising the steps of capturing return light from the indicia during reading by using a solid-state imager including an array of image sensors; generating and directing high intensity illumination light from a light source to the indicia with concomitant generation of excess heat; and dissipating the excess heat to improve reader performance.

In accordance with yet another aspect of the invention, an imaging module for use in electro-optically reading indicia, comprises a chassis; a solid-state imager supported by the chassis, including an array of image sensors for capturing return light from the indicia during reading; a light source supported by the chassis, for generating and directing high intensity illumination light to the indicia with concomitant generation of excess heat; and means for dissipating the excess heat to improve reading performance.

Hence, by removing the excess heat, the operating lifetimes of the imager, the LEDs, the controller and other reader components are extended, and the performance of the reader is enhanced.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
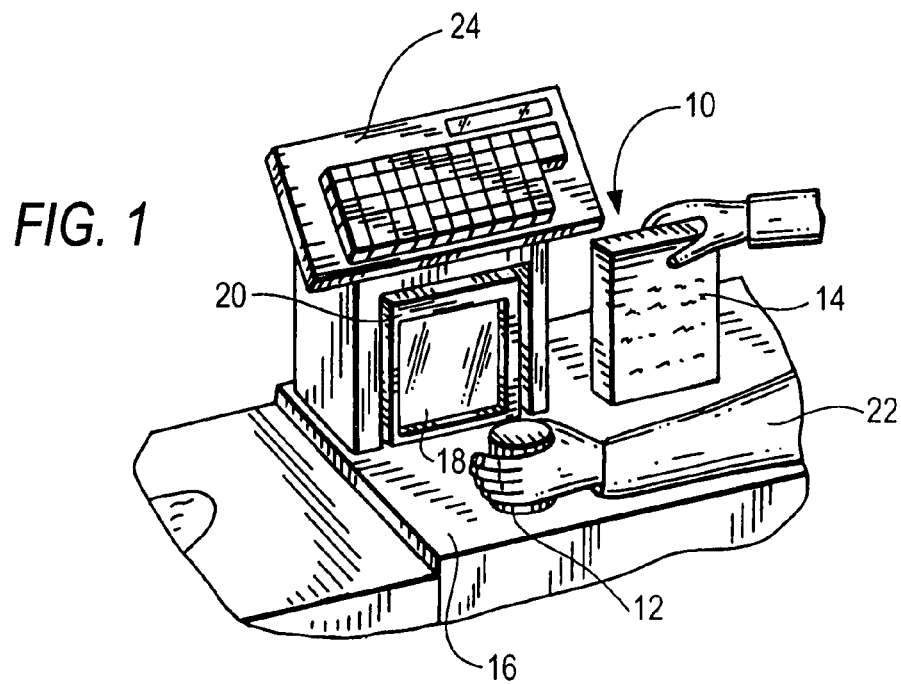
FIG. 1 is a perspective view of one embodiment of an imaging reader operative for capturing light from symbol-bearing targets in accordance with this invention.
Figure 4:
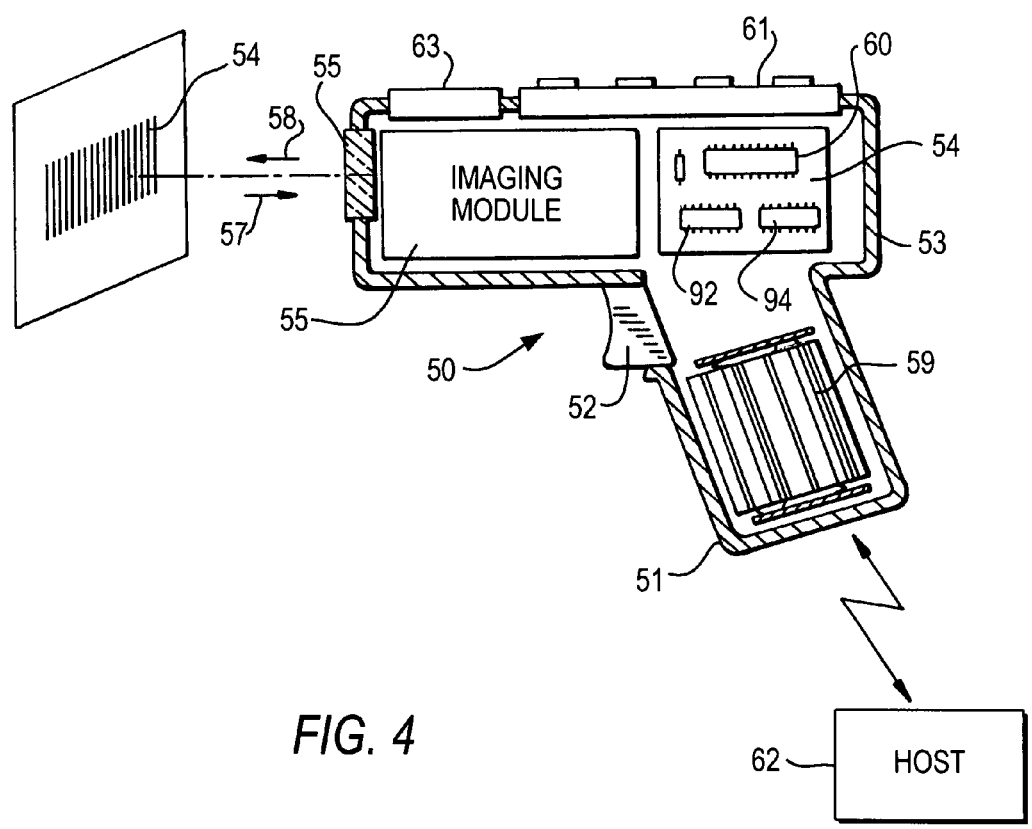
FIG. 4 is a schematic view of yet another embodiment of an imaging reader operative for capturing light from symbol-bearing targets in accordance with this invention.
Figure 5:
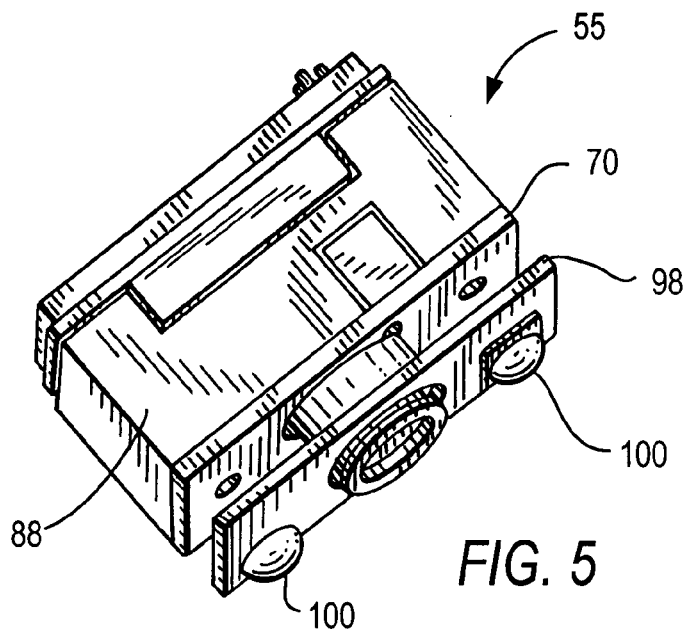
FIG. 5 is a perspective view of an imaging module for use with any of the readers.
Figure 6:
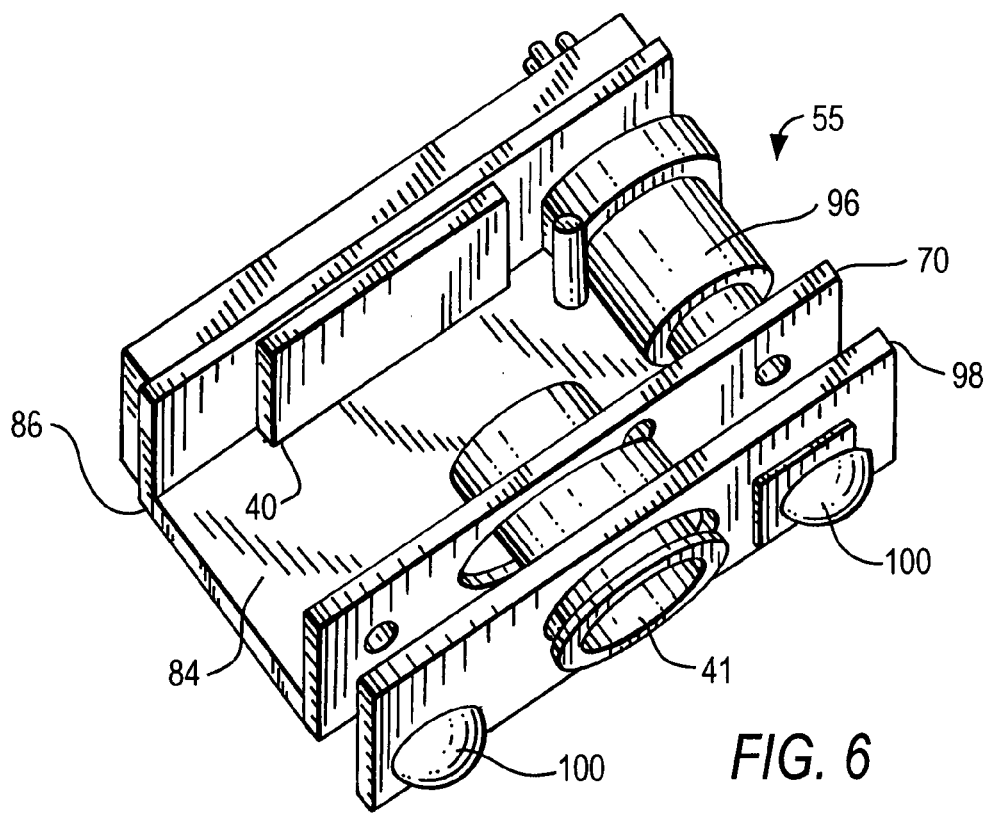
FIG. 6 is an enlarged, exploded, perspective view of the imaging module of FIG. 5.

Reference numeral 10 in FIG. 1 generally identifies a workstation for processing transactions and specifically a checkout counter at a retail site at which products, such as a can 12 or a box 14, each bearing a target symbol, are processed for purchase. The counter includes a countertop 16 across which the products are slid at a swipe speed past a generally vertical window (i.e., presentation area) 18 of a box-shaped, portable, vertical slot, imaging reader 20 mounted on the countertop 16. A checkout clerk or operator 22 is located at one side of the countertop, and the reader 20 is located at the opposite side. A cash/credit register 24 is located within easy reach of the operator. In the frequent event that large, heavy, or bulky products, that cannot easily be brought to the reader 20, have target symbols that are required to be read, then the operator 22 may also manually grasp the portable reader 20 and lift it off, and remove it from, the countertop 16 for reading the target symbols in a hand-held mode of operation. The reader need not be box-shaped as illustrated, but could have virtually any housing configuration, such as a gun shape, as depicted in FIGS. 2 and 4.

Figure 2:
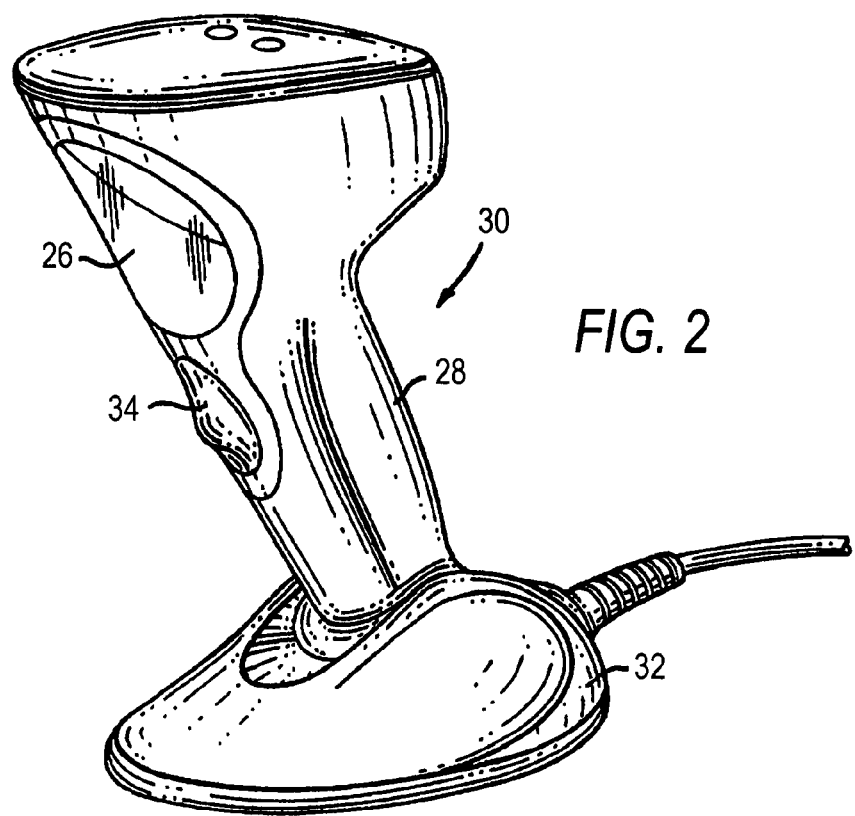
FIG. 2 is a perspective view of another embodiment of an imaging reader operative for capturing light from symbol-bearing targets in accordance with this invention.

Reference numeral 30 in FIG. 2 generally identifies another imaging reader having a different configuration from that of reader 20. Reader 30 also has a generally vertical window (i.e., presentation area) 26 and a gun-shaped housing 28 supported by a base 32 for supporting the reader 30 on a countertop. The reader 30 can thus be used as a stationary workstation in which products are slid or swiped past the generally vertical window 26, or can be picked up off the countertop and held in the operator's hand and used as a handheld reader in which a trigger 34 is manually depressed to initiate reading of the symbol.

Figure 3:
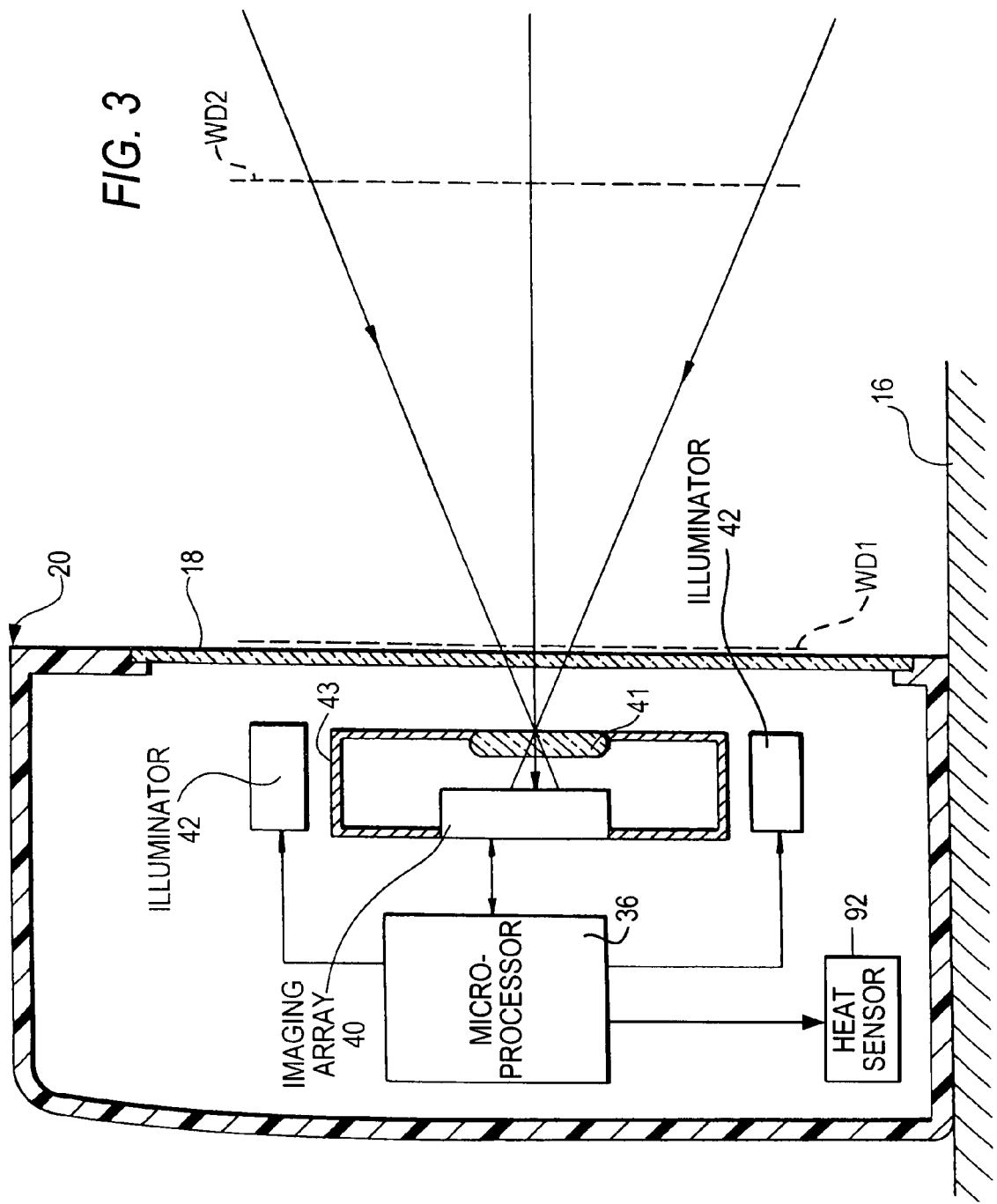
FIG. 3 is a block diagram of various components of the reader of FIG. 1.

As schematically shown in FIG. 3, an imager 40 and an imaging lens assembly 41 are mounted in an enclosure 43 in either reader, such as the reader 20. The imager 40 is a solid-state device, for example, a CCD or a CMOS imager and has an array of addressable image sensors operative for capturing light through the window 18 from a target, for example, a one- or two-dimensional symbol, over a field of view and located in a working range of distances between a close-in working distance (WD1) and a far-out working distance (WD2). In a preferred embodiment, WD1 is about two inches from the imager array 40 and generally coincides with the window 18, and WD2 is about eight inches from the window 18. An illuminator is also mounted in the reader and includes a light source, e.g., a light emitting diode (LED) 42, or preferably a plurality of LEDs 42, arranged at opposite sides of the imager 40 to uniformly illuminate the target.

As shown in FIG. 3, the imager 40 and the illuminator LEDs 42 are operatively connected to a controller or microprocessor 36 operative for controlling the operation of these components. Preferably, the microprocessor is the same as the one used for decoding light scattered from the indicia and for processing and analyzing the captured target images.

In operation, the microprocessor 36 sends a command signal to pulse the illuminator LEDs 42 for a short time period, say 500 microseconds or less, and energizes the imager 40 to collect light from a target symbol only during said time period. A typical array needs about 33 milliseconds to read the entire target image and operates at a frame rate of about 30 frames per second. The array may have on the order of one million addressable image sensors.

Reference numeral 50 in FIG. 4 generally identifies a handheld, gun-shaped, imaging reader for electro-optically reading indicia, such as bar code symbol 54, or other marking, located in a range of working distances therefrom. The reader 50 has a pistol grip handle 51 and a manually actuatable trigger 52 which, when depressed, actuates an imaging module or scan engine 55, as described below, to collect return light from the indicia 54. The reader 50 includes a housing 53 in which the scan engine 55, signal processing circuitry including a controller 60 mounted on a printed circuit board 64, and a battery pack 59 are accommodated. A light-transmissive window 56 at a front of the housing enables the return light 57 to enter the housing, and allows illumination light 58 emitted from the scan engine 55, as described below, to exit the housing. A keyboard 61 and a display 63 may advantageously be provided on a top wall of the housing for ready access thereto.

In use, an operator holding the handle 51 aims the housing at the symbol and depresses the trigger 52. The scan engine emits the illumination light 58, in the same manner as the illumination light is emitted by the illuminator 42 in FIG. 3. The return light 57 that is scattered and reflected from the symbol 54 is optically modified and focused by an optical focusing assembly onto an imager in the scan engine, in the same manner as the return light is focused by the lens 41 onto the imager 40 in FIG. 3.

The scan engine 55 thus includes at least the imager 40 and the illuminator 42, both supported on a common chassis, as described more fully below in connection with FIGS. 5-8. Other components, for example, the microprocessor or controller 60 that, in a manner similar to the controller 36 of FIG. 3, decodes a signal generated by the imager 40 to extract the data encoded in the symbol, can also be supported on the chassis, again as indicated below.

As discussed above, the reading performance of each imaging reader is highly dependent on the level of the illumination light 58 that is directed to the symbol 54. The higher the level of the illumination light 58, the better is the reading performance. Hence, high-powered light source(s) 42 are electrically driven by the controller 36, 60 at relatively high electrical drive currents, thereby projecting high intensity illumination light onto the symbol. This, however, concomitantly undesirably generates significant excess heat that can degrade and shorten the working lifetime of components of the reader, especially the imager 40, the light source(s) 42 and the controller 36, 60.

Figure 7:
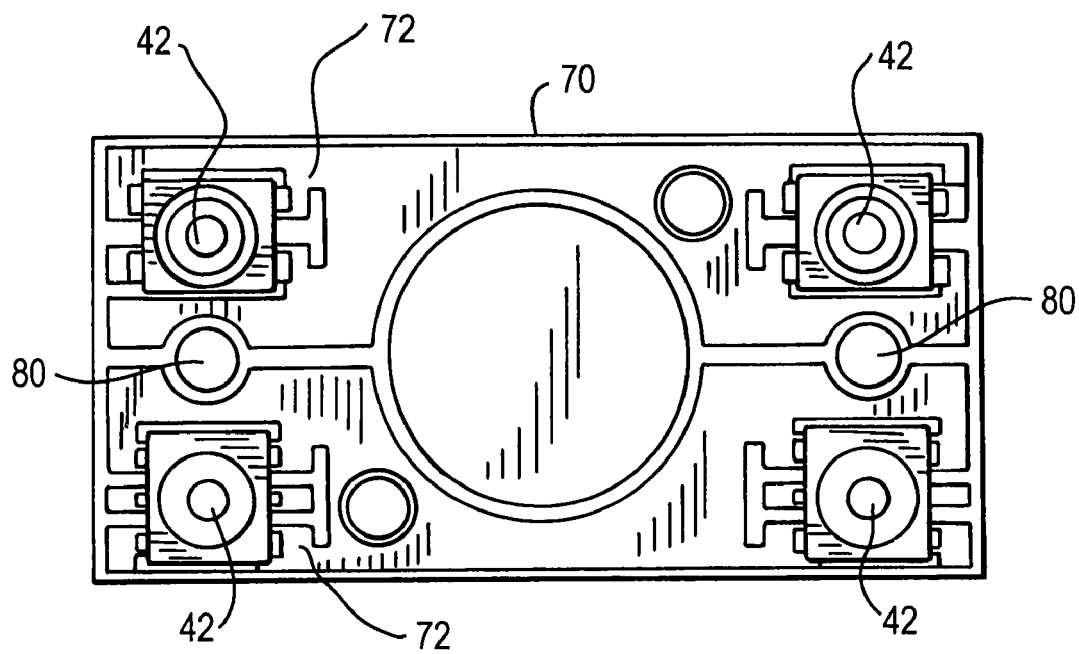
FIG. 7 is a front elevational view of a detail within the imaging module of FIG. 5.
Figure 8:
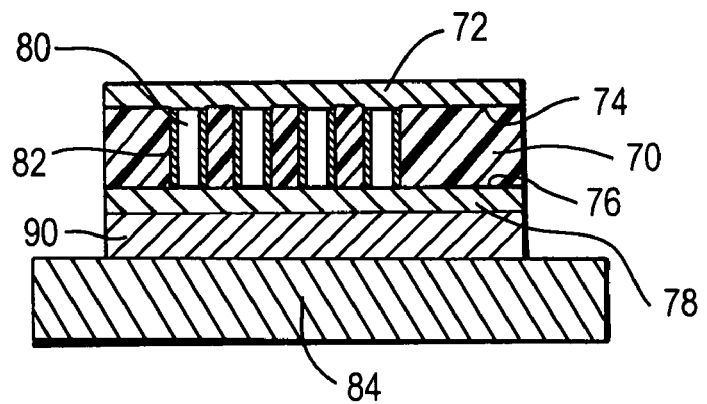
FIG. 8 is a sectional view of a detail within the imaging module of FIG. 5.

In accordance with one aspect of the invention, various thermal management procedures are employed to dissipate the excess heat to improve reader performance. For example, each illumination LED 42, as best seen in FIG. 7, is surface-mounted on one of a pair of opposite surfaces 74, 76 (see FIG. 8) of a printed circuit board 70. Thermally conductive, metallized lands 72, 78 or pads, preferably of copper, are plated on the opposite surfaces 74, 76 of the board. A hole or thermal via 80 extends through the opposite surfaces 74, 76 of the board 70 and is internally plated and lined with a thermally conductive, metallized layer 82, preferably of copper, in thermal communication with the lands 72, 78 on the opposite surfaces 74, 76 of the board 70. Each illumination LED 42 is in thermal communication, preferably by soldering, with one of the lands 72 to conduct the excess heat away from the respective LED 42 from the land 72 on one surface 74 via the plated hole 80 to the opposite land 78 on the opposite surface 76. This thermal management procedure is especially recommended when the board 70 is small in area such that the lands on one surface, i.e., the front surface 74, of the board 70 are insufficient in area to radiate the excess heat to the environment. By also using the land 78 on the opposite rear surface 76 to dissipate the excess heat, the total area for radiating the excess heat to the environment is increased, and the heat-sinking capability is enhanced.

A chassis 84 (see FIGS. 6 and 8) comprised of a thermally conductive material, e.g., zinc, is operative for supporting at least the imager 40 on a printed circuit board 86 and the high-powered light source(s) 42 on the board 70 that is oriented to be parallel to the board 86. Another top printed circuit board 88 (see FIG. 5) lies between the boards 86, 70 above the chassis 84. All electrical connections between the components on the boards 86, 70 are made via the board 88. All of these components and boards together constitute the imaging module or scan engine 55.

The metal chassis 84 is preferably in thermal communication with one of the lands 78 to conduct the excess heat away from each LED 42 to the chassis 84. The opposite rear surface 76 of the board 70 is in close proximity with the thermally conductive chassis 84 of the scan engine 55. Provision is made to conduct the excess heat from the opposite rear surface 76 of the board 70 to the chassis 84 by means of a heat conductive medium 90, such as thermal grease or thermally conductive, silicone pads. Alternatively, the land 78 on the opposite rear surface 76 of the board 70 can be positioned in direct contact with the chassis 84. As a result, the entire chassis 84 now becomes part of the heat sink for the high-powered light source(s) 42.

The metal chassis 84 can have ribs or fins to aid in radiation of the excess heat to the ambient environment, but sometimes the scan engine 55 is embedded in a reader in such a way as to make radiation of the excess heat unavailable. Worse yet, the scan engine 55 may be mounted close to a heat source that may actually increase the temperature of the scan engine 55. In these cases, additional measures must be taken to assure that the LEDs 42, and other electronic components in the scan engine 55, do not overheat.

In accordance with another aspect of this invention, a thermistor, a thermocouple, or a like thermal sensor 92 (see FIGS. 3 and 4) is located in a circumambient region of the light source 42, for monitoring the temperature of the chassis 84 and sensing when the excess heat reaches a predetermined threshold, and for generating a control signal when the threshold has been reached. For example, the thermal sensor 92 can be mounted on one of the circuit boards 70, 86, 88 close to, or in contact with, the chassis 84. Thermal grease or other thermally conductive material may be used to insure that the thermal sensor 92 is thermally connected to the chassis 84, the circuit board 70 that supports the LEDs 42, or other part of the scan engine 55 that is deemed to be representative of the temperature sensitive components in the scan engine 55 that must be protected from overheating. The controller 36, 60 is advantageously operative for causing the excess heat to be reduced upon generation of the control signal. Alternatively, or in addition, a host 62 (see FIG. 4) in communication with the reader via a radio frequency or infrared transceiver 94 is provided for causing the excess heat to be reduced upon generation of the control signal.

Various thermal management procedures include at least one of the controller 36, 60 and the host 62 being operative for shutting off the light source 42 upon generation of the control signal; or for energizing the light source 42 for a time period during reading with the high intensity illumination light 58, and for shortening the time period upon generation of the control signal; or for driving the light source 42 with a high amplitude drive current during reading with the high intensity illumination light 58, and for reducing the high amplitude drive current upon generation of the control signal; or for driving the light source 42 comprised of a plurality of light emitting diodes (LEDs) during reading with the high intensity illumination light 42, and for reducing the number of LEDs upon generation of the control signal; or for causing the imager 40 to capture the return light in a plurality of images per frame during reading with the high intensity illumination light 58, and for reducing the number of images captured per frame upon generation of the control signal; or for periodically energizing the light source 42 to cause the high level illumination light 58 to illuminate the indicia 24 during a plurality of frames, and periodically deenergizing the light source 42 to cause the high level illumination light 58 not to illuminate the indicia during at least one of the frames upon generation of the control signal. All of these thermal management procedures have in common the feature of reducing the heat generated by the LEDs 42. The thermal management procedures may be initiated in succession or in combinations depending on how hot the scan engine 55 gets. At a first temperature threshold, moderate thermal management procedures can be initiated. If temperature continues to rise, further more aggressive thermal management procedures can be initiated.

One possible thermal management procedure could be to inhibit activation of the LEDs 42 and other components of the scan engine 55 entirely until such time as the temperature returns to an acceptable threshold level. Another possibility is to reduce the time that the LEDs 42 are permitted to be turned on for each exposure of the imager. Other possibilities are to reduce the current to the LEDs 42 during an exposure, to reduce the number of LEDs 42 that are actuated, or to reduce the frequency with which the LEDs 42 can be activated. An example of reducing LED activation frequency would be to reduce the number of images that the imager 40 can capture each second, thereby eliminating the need to activate the LEDs 42 as frequently. For example, some area imagers 40 are capable of capturing images at up to 60 frames per second. This high frame rate can help the reader feel more responsive to a user, but in the case of an impending overheating condition, the frame rate might be reduced to 50, 40, or 30 frames per second, etc., as necessary, to achieve an acceptable temperature. This would permit the LEDs 42 to be turned off during the time when the additional frames would otherwise be occurring. Users might notice a small loss of responsiveness when the number of frames is reduced, but this is preferable to failure of the reader.

Many imaging engines 55 also have an aiming light source 96 (see FIG. 6), such as an LED or laser that is used to project a visual aiming pattern, mark, or beam of light on the symbol 54 so as to facilitate reading. The aiming light source 96 is mounted on the board 86 and also generates heat and is sensitive to overheating conditions. A support plate 98 supports lenses or optical elements 100, such as a diffractive element or a Fresnel lens, to optically modify the aiming beam generated by the aiming light source 96 to create the aiming pattern. One or more of the lenses 100 could also be used to focus the illumination light 58. The focusing lens assembly 41 for focusing the return light 57 onto the imager 40 extends through the support plate 98. Thermal management procedures could therefore include the ability to reduce an electrical drive current to energize the aiming light source 96, to reduce a frequency of activation of the aiming light source 96 (for example, only activating the aiming pattern every other frame), or to entirely turn off any aiming light source 96 when the temperature exceeds a predetermined threshold.

When an overheating condition is detected by the thermal sensor 92 that requires initiation of heat reducing procedures such as those described above, the scan engine 55 can transmit a message, i. e., the control signal, to the host 62 or to the controller 36, 60 that indicates that the overheating situation is occurring, so that measures can be taken to reduce the excess heat, thereby insuring that the scan engine 55 can operate at maximum performance. For example, if the host 62 is in control of the frame rate, the activation control of the illumination LEDs 42, or the aiming light source 96, the host 62 can implement thermal management procedures as outlined above. Alternatively, or in addition, the controller 36, 60, that decodes the symbol 54 and controls some of the other reader components, can implement some or all of the thermal management procedure, either independently or in combination with the host 62

The message sent to the host 62 may take the form of transmitting the control signal from the thermal sensor 92 directly to the host 62 so that the host 62 can monitor the scan engine temperature. Alternatively, if the scan engine 55 includes an on-board microprocessor, the message can be transmitted by activating a dedicated line or transmitting the message in digital form.

In accordance with another aspect of the invention, the method of electro-optically reading indicia, comprising the steps of capturing return light 57 from the indicia 24 during reading by using a solid-state imager 40 including an array of image sensors; generating and directing high intensity illumination light 58 from a light source 42, 96 to the indicia 24 with concomitant generation of excess heat; and dissipating the excess heat to improve reader performance.

In accordance with yet another aspect of the invention, an imaging module 55 for use in electro-optically reading indicia 24, comprises a chassis 84; a solid-state imager 40 supported by the chassis 84, including an array of image sensors for capturing return light 57 from the indicia 24 during reading; a light source 42, 96 supported by the chassis 84, for generating and directing high intensity illumination light 58 to the indicia with concomitant generation of excess heat; and means for dissipating the excess heat to improve reading performance.

Hence, by removing the excess heat, the operating lifetimes of the imager 40, the LEDs 42, 96, the controller 36, 60 and other reader components are extended, and the performance of the reader is enhanced.

It will be understood that each of the elements described above, or two or more together, also may find a useful application in other types of constructions differing from the types described above. Thus, readers having different configurations can be used.

While the invention has been illustrated and described as controlling excess heat in an imaging reader, module and method, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. A reader for electro-optically reading indicia, comprising:
    a solid-state imager including an array of image sensors for capturing return light from the indicia during reading;
    a light source for generating and directing high intensity illumination light to the indicia with concomitant generation of excess heat;
    a thermal sensor located in a circumambient region of the light source for generating a control signal in response to the excess heat generated by the light source; and
    a controller connected to the light source and the thermal sensor, the controller being operative for energizing the light source for a time period during reading with the high intensity illumination light, and being further operative for shortening the time period in response to the control signal, thereby causing the excess heat generated by the light source to be reduced.

2. The reader of claim 1, wherein the controller energizes the light source with a high amplitude drive current to generate the high intensity illumination light during the reading.

3. The reader of claim 1, and a housing having a presentation area, and wherein the light source is located within the housing and directs the high intensity illumination light through the presentation area to the indicia for reflection therefrom as the return light.

4. The reader of claim 1, further comprising a heat dissipater for conducting the excess heat away from the light source.

5. The reader of claim 4, wherein the heat dissipater includes a printed circuit board having opposite surfaces; wherein the light source includes a light emitting diode (LED) surface-mounted on one of the surfaces of the board; and wherein the heat dissipater further includes thermally conductive lands on the opposite surfaces of the board, and a hole extending through the opposite surfaces of the board and being plated with a thermally conductive layer in thermal communication with the lands, and wherein the LED is in thermal communication with one of the lands to conduct the excess heat away from the LED.

6. The reader of claim 5, and a chassis comprised of a thermally conductive material, for supporting the imager and the light source, and being in thermal communication with one of the lands to conduct the excess heat away from the LED to the chassis.

7. The reader of claim 4, wherein the heat dissipater includes a thermal sensor located in a circumambient region of the light source, for sensing when the excess heat reaches a predetermined threshold, and for generating a control signal when the threshold has been reached.

8. The reader of claim 7, wherein the controller causes the excess heat to be reduced upon generation of the control signal.

9. The reader of claim 1, and a host operatively connected to the light source and the thermal sensor, for causing the excess heat to be reduced upon generation of the control signal.

10. The reader of claim 9, wherein at least one of the controller and the host is operative for shutting off the light source upon generation of the control signal.

11. The reader of claim 9, wherein at least one of the controller and the host is operative for energizing the light source for a time period during reading with the high intensity illumination light, and is further operative for shortening the time period upon generation of the control signal.

12. The reader of claim 9, wherein at least one of the controller and the host is operative for driving the light source with a high amplitude drive current during reading with the high intensity illumination light, and is further operative for reducing the high amplitude drive current upon generation of the control signal.

13. The reader of claim 9, wherein at least one of the controller and the host is operative for driving the light source comprised of a plurality of light emitting diodes (LEDs) during reading with the high intensity illumination light, and is further operative for reducing the number of LEDs upon generation of the control signal.

14. The reader of claim 9, wherein at least one of the controller and the host is operatively connected to the imager, and is operative for causing the imager to capture the return light in a plurality of images per frame during reading with the high intensity illumination light, and is further operative for reducing the number of images captured per frame upon generation of the control signal.

15. The reader of claim 9, wherein at least one of the controller and the host periodically energizes the light source to cause the high level illumination light to illuminate the indicia during a plurality of frames, and periodically deenergizes the light source to cause the high level illumination light not to illuminate the indicia during at least one of the frames upon generation of the control signal.

16. The reader of claim 1, and a chassis for supporting the imager and the light source in an imaging module, and wherein the thermal sensor is supported by, and is in thermal communication with, the chassis.

17. The reader of claim 1, wherein the light source is operative for directing the high intensity illumination light in an aiming pattern to and on the indicia.

18. A reader for electro-optically reading indicia, comprising:
    imager means for capturing return light from the indicia during reading;
    means for generating and directing high intensity illumination light to the indicia with concomitant generation of excess heat;
    means for generating a control signal in response to the excess heat generated by the high intensity illumination light; and means for generating the high intensity illumination light for a time period during reading, and shortening the time period in response to the control signal, thereby causing the excess heat generated by the high intensity illumination light to be reduced.

19. A method of electro-optically reading indicia, comprising the steps of:
   capturing return light from the indicia during reading by using a solid-state imager including an array of image sensors;
   generating and directing high intensity illumination light from a light source to the indicia with concomitant generation of excess heat; and
   generating a control signal in response to the excess heat generated by the light source; and
   generating the high intensity illumination light for a time period during reading, and shortening the time period in response to the control signal, thereby causing the excess heat generated by the light source to be reduced.

20. The method of claim 19, and energizing the light source with a high amplitude drive current to generate the high intensity illumination light during the reading.

21. The method of claim 19, and configuring a housing with a presentation area, and locating the light source within the housing, and directing the high intensity illumination light through the presentation area to the indicia for reflection therefrom as the return light.

22. The method of claim 19, further comprising conducting the excess heat away from the light source.

23. The method of claim 19, and surface-mounting a light source comprised of a light emitting diode (LED) on one of a pair of opposite surfaces of a printed circuit board; and providing thermally conductive lands on the opposite surfaces of the board, and plating a hole extending through the opposite surfaces of the board with a thermally conductive layer in thermal communication with the lands, and providing thermal communication between the LED and one of the lands to conduct the excess heat away from the LED.

24. The method of claim 23, and supporting the imager and the light source by a chassis comprised of a thermally conductive material, and providing thermal communication between the chassis and one of the lands to conduct the excess heat away from the LED to the chassis.

25. The method of claim 19, further comprising locating a thermal sensor in a circumambient region of the light source, sensing when the excess heat reaches a predetermined threshold, and generating a control signal when the threshold has been reached.

26. The method of claim 25, and causing the excess heat to be reduced upon generation of the control signal.

27. The method of claim 25, and shutting off the light source upon generation of the control signal.

28. The method of claim 25, and energizing the light source for a time period during reading with the high intensity illumination light, and shortening the time period upon generation of the control signal.

29. The method of claim 25, and driving the light source with a high amplitude drive current during reading with the high intensity illumination light, and reducing the high amplitude drive current upon generation of the control signal.

30. The method of claim 25, and driving the light source comprised of a plurality of light emitting diodes (LEDs) during reading with the high intensity illumination light, and reducing the number of LEDs upon generation of the control signal.

31. The method of claim 25, and causing the imager to capture the return light in a plurality of images per frame during reading with the high intensity illumination light, and reducing the number of images captured per frame upon generation of the control signal.

32. The method of claim 25, and periodically energizing the light source to cause the high level illumination light to illuminate the indicia during a plurality of frames, and periodically deenergizing the light source to cause the high level illumination light not to illuminate the indicia during at least one of the frames upon generation of the control signal.

33. The method of claim 25, and supporting the imager and the light source in a chassis of an imaging module, and supporting the thermal sensor by, and in thermal communication with, the chassis.

34. The method of claim 19, wherein the directing step is performed by directing the high intensity illumination light in an aiming pattern to and on the indicia.

35. An imaging module for use in electro-optically reading indicia, comprising:
   a chassis;
   a solid-state imager supported by the chassis, including an array of image sensors for capturing return light from the indicia during reading;
   a light source supported by the chassis, for generating and directing high intensity illumination light to the indicia with concomitant generation of excess heat;
   a thermal sensor located in a circumambient region of the light source for generating a control signal in response to the excess heat generated by the light source; and
   a controller connected to the light source and the thermal sensor, the controller being operative for energizing the light source for a time period during reading with the high intensity illumination light, and being further operative for shortening the time period in response to the control signal, thereby causing the excess heat generated by the light source to be reduced.

36. The module of claim 35, further comprising a heat dissipater including a printed circuit board supported by the chassis and having opposite surfaces; wherein the light source includes a light emitting diode (LED) surface-mounted on one of the surfaces of the board; and wherein the heat dissipater further includes thermally conductive lands on the opposite surfaces of the board, and a hole extending through the opposite surfaces of the board and being plated with a thermally conductive layer in thermal communication with the lands, and wherein the LED is in thermal communication with one of the lands to conduct the excess heat away from the LED.

37. The module of claim 35, wherein the chassis is comprised of a thermally conductive material, and is in thermal communication with one of the lands to conduct the excess heat away from the light source to the chassis.

38. The module of claim 35, wherein the thermal sensor senses when the excess heat reaches a predetermined threshold, and generates a control signal when the threshold has been reached.

39. The module of claim 35, wherein the light source is operative for directing the high intensity illumination light in an aiming pattern to and on the indicia.

* * * * *